United States Patent [19]
Carrier, III et al.

[11] Patent Number: 5,903,897
[45] Date of Patent: May 11, 1999

[54] SOFTWARE DOCUMENTATION RELEASE CONTROL SYSTEM

[75] Inventors: David F. Carrier, III, Plano; R. John K. Gillespie, Carrollton; Janet Kwai Fun Lui, Dallas; Donald L. Weeks, Jr., Richardson, all of Tex.

[73] Assignee: Alcatel USA Sourcing, L.P., Plano, Tex.

[21] Appl. No.: 08/768,405

[22] Filed: Dec. 18, 1996

[51] Int. Cl.$^6$ .................................................. G06F 9/445
[52] U.S. Cl. ..................... 707/203; 707/102; 707/511; 707/531; 395/183.14; 395/712
[58] Field of Search .................. 707/102, 203, 707/511, 531; 395/183.14

[56] References Cited

U.S. PATENT DOCUMENTS

| | | | |
|---|---|---|---|
| 4,558,413 | 12/1985 | Schmidt et al. | 364/300 |
| 4,696,003 | 9/1987 | Kerr et al. | 395/183.14 |
| 4,751,635 | 6/1988 | Kret | 364/200 |
| 4,809,170 | 2/1989 | Leblang et al. | 364/200 |
| 4,864,569 | 9/1989 | DeLucia et al. | 395/183.14 |
| 4,912,637 | 3/1990 | Sheedy et al. | 364/300 |
| 4,951,192 | 8/1990 | Chase, Jr. et al. | 364/200 |
| 5,038,316 | 8/1991 | Hempleman et al. | 707/531 |
| 5,155,847 | 10/1992 | Kirouac et al. | 395/600 |
| 5,278,979 | 1/1994 | Foster et al. | 707/203 |
| 5,291,598 | 3/1994 | Grundy | 395/650 |
| 5,339,435 | 8/1994 | Lubkin et al. | 395/700 |
| 5,452,206 | 9/1995 | Turrietta et al. | 707/531 |
| 5,671,415 | 9/1997 | Hossain et al. | 395/701 |

FOREIGN PATENT DOCUMENTS 0323707  7/1989  European Pat. Off. ........ G06F 11/00

OTHER PUBLICATIONS

Hinds et al., "Maintaining Multiple Versions of a Document", SIGDOC Conference Proceedings, ACM, pp. 121–124, Nov. 1989.

M. Yip, "Automatic Large–Scale Software Integration", Rare Earth Elements and Their Compounds, no. 1987, Jun. 23, 1987, pp. 532–535.

I. Sommerville, et al., "SOFTLIB—A Documentation Management System", Software Practice & Experience, vol. 16, No. 2, Feb. 1986, pp. 131–143.

Appendices A–E, Andre van der Hoek, www.cs.colorado.edu/users/andre/configuration–management.html, Sep. 30, 1996.

Fletton et al., "Redocumenting Software Systems using Hypertext Technology", IEEE, Mar. 1988, pp. 54–59.

*Primary Examiner*—Thomas G. Black
*Assistant Examiner*—Jean R. Homere
*Attorney, Agent, or Firm*—Baker & Botts, L.L.P.

[57] ABSTRACT

A system and method (510) for software documentation process control includes the steps of receiving and storing check-in data related to documentation (540, 542, 544, 546, 550, 552) checked into a version control system (12). Subsequently, the documentation are associated with a specific version and release of a software product, and tags the documentation with a unique label indicative of the specific version and release of the software product. The documentation is stored in a project file directory (566) associated with the specific version and release of the software product.

18 Claims, 9 Drawing Sheets

SOFTWARE DOCUMENTATION RELEASE CONTROL SYSTEM

RELATED APPLICATIONS

This patent application is related to co-pending U.S. patent applications: U.S. patent application Ser. No. 08/724,830, entitled Software Release Control System and Method, filed Oct. 2, 1996, of the same assignee, U.S. patent application Ser. No. 08/769,634, entitled Software Release Media Download System and Method, filed Dec. 18, 1996, of the same assignee, U.S. patent application Ser. No. 08/769,226, entitled Software Release Metric Reporting System and Method, filed Dec. 18, 1996, of the same assignee, and U.S. patent application Ser. No. 08/769,225, entitled Software Testing Process Control System and Method, filed Dec. 18, 1996, of the same assignee.

TECHNICAL FIELD OF THE INVENTION

This invention is related in general to the field of computer software systems. More particularly, the invention is related to a software release document process control system and method.

BACKGROUND OF THE INVENTION

Large-scale software development efforts require proper coordination and management of teams of software engineers and test engineers. When a software development effort involves a large group of engineers simultaneously working on multiple versions and releases of a large number of different source modules of the software product, confusion and inefficiency easily results if the development process and subsequent product release are not properly managed.

For example, some engineers may be coding source modules for version 3.1 of a software product X, while some engineers may be incorporating newer features into source modules for version 4.0, and still some engineers may be providing a fix to some problems reported in source modules of version 2.1. Note that it is possible to have overlap between the three groups of engineers, so that an engineer may be involved in all three efforts.

Compounding the problem is the fact that each version of a software product must pass through multiple developmental stages prior to its release, where advancing to the next stage requires the passing of some predetermined testing and approval process. To be tested, all the source modules for that version of the software product must be collected and built into a load. The process of load building is also called compiling and linking of all the source modules. The resultant load or build is the software product to be tested or to be delivered to the customers when all the developmental stages have been passed.

Previously, the process of determining which source modules to collect, collecting the source modules, and building the load therefrom was tedious and time-consuming. Many hours were spent in meetings with software engineers and managers to determine which source modules should be included in which version, and what reported problems were fixed by which source modules, and whether the source modules with new features should be included in the present build. The end result is a list of source modules that is used to identify and pull the source modules, typically from a version control subsystem into which engineers have checked in their work. The source modules are then manually identified and compiled into a load, and manually downloaded into a storage medium such as a tape or compact disc for delivery to the customers.

In addition, the task of preparing and collecting the documentation related to specific versions and releases of the software product is daunting. Documentation may include those that are generated for internal usage and to document knowledge, and those generated for auditing purposes, and for customer training or education. These documentation may include project meeting minutes, requirements documentation, design specification documentation, standards checklist used when the project goes from one phase of development to the next, test cases, test reports, customer documentation and manuals, build procedures, build reports, etc. Therefore, it is a substantial task to ensure that documentation for a software product is properly associated with the correct version and release of software product.

It may be seen that because the process of building a software load and document preparation and collection are repeatedly performed in the development of the software product, considerable savings in time, energy, and funds are possible if the process is automated and made more efficient.

SUMMARY OF THE INVENTION

Accordingly, there is a need for apparatus and method for software release document process control that automates and stream lines the document preparation and collection process.

In accordance with the present invention, at least one document related to a predetermined version and release of a software product is checked into a version control system. A document collector coupled to the version control system is adapted for associating the document with the predetermined version and release of the software product.

In one aspect of the invention, an automated method for software documentation process control includes the steps of receiving at least one document, assigning a unique label indicative of a part number of a software product to the document, and storing the document in a predetermined project file document directory.

In another aspect of the invention, an automated method for software file release with documentation process control includes the steps of receiving and storing check-in data related to source modules checked into a version control system and building a load from a subset of the checked in source modules, and receiving and storing check-in data related to documentation checked into the version control system. Subsequently, the method associates the documentation with the source modules and a specific version and release of a software product, and tags the documentation with a unique label indicative of the specific version and release of the software product. The documentation is stored in a project file directory associated with the specific version and release of the software product.

BRIEF DESCRIPTION OF THE DRAWINGS

For a better understanding of the present invention, reference may be made to the accompanying drawings, in which.

DETAILED DESCRIPTION OF THE INVENTION

The preferred embodiment(s) of the present invention is (are) illustrated in FIGS. 1–12, where like reference numerals being used to refer to like and corresponding parts of the various drawings.

Figure 1:
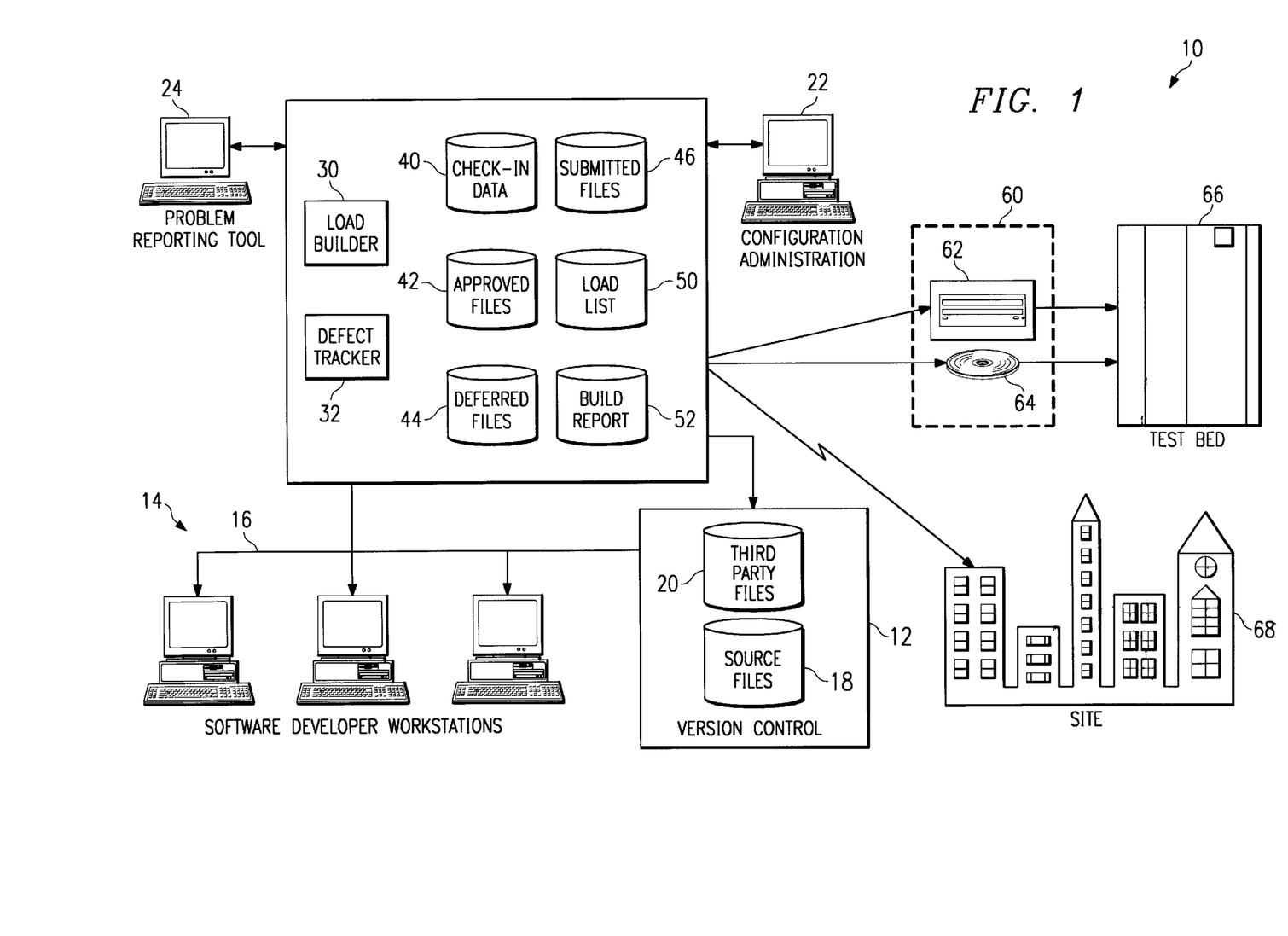
FIG. 1 is a simplified block diagram of an exemplary software release control system constructed according to the teachings of the present invention.

Referring to FIG. 1, a block diagram of a software release control system 10 constructed according to the teachings of the present invention is shown. Software release control system 10 uses a version control subsystem 12 to manage the numerous versions of software modules or files developed by software engineers. Version control subsystem 12 may be coupled to software release control system 10 and a number of workstations, personal computers, terminals, or any suitable data display and entry device 14, via a computer network 16. At least two databases or files are included in version control subsystem 12—source files 18 for storing source modules being developed or modified, and third party files 20 for storing source modules of third party software that will be incorporated into the load. During code development, engineers check out source files to work on and check them back in at the end of the work session. Version control subsystem 12 generally keeps track of what changes were made to the file. Examples of available version control subsystems include ClearCase by Pure Atria Software of Shaumburg, Ill.; Control Version System by Free Software Foundation of Cambridge, Mass.; DSEE by Hewlett Packard of Palo Alto, Calif.

Further coupled to software release control system 10 is another data display and entry device 22 provided for configuration administrator(s), who has authority to initiate and oversee the load building process. A problem reporting tool 24, represented in FIG. 1 by a data display and entry device, is also coupled to software release control system 10. Problem reporting tool 24 is used to record problems reported by customers, test engineers, and other sources. Each problem report is assigned a unique problem report number for tracking and auditing purposes.

Software release control system 10 includes a number of tools, including a load builder 30 and a defect tracker 32. A number of files or databases are also included for storing a variety of data: check-in data 40, approved files 42, deferred files 44, submitted files 46, load list 50, and build report 52. Check-in data database 40 stores records associated with source modules that have been checked into version control subsystem 12. Check-in data 40 may include the developer's name, file name, check-in number, product, release, check-in time, total number of lines, number of lines changed, etc. Approved files database 42 stores data associated with source modules that have received approval for inclusion into a build, while deferred files database 44 stores data associated with source modules that have been denied inclusion into a build. Submitted files database 46 stores data associated with those source modules that have been attached to release forms. Release forms are logical groupings of source modules collected and submitted for the build process. Load list file 50 contains a list of built modules and third party software that have been identified to go onto deliverable media. The load list is used during generation of the deliverable media. Build report database 52 stores data generated from the load building process. Hard copy reports may then be generated from data stored in build report database 52.

After a load is built, it may be downloaded to a portable storage medium 60, such as a tape 62 and compact disc 64. Storage medium 60 containing a load may then be tested on a test bed 66. In addition, the load may be electronically transferred to a remote site 68, via telecommunications networks or computer networks, for operations and/or testing.

Figure 2A:
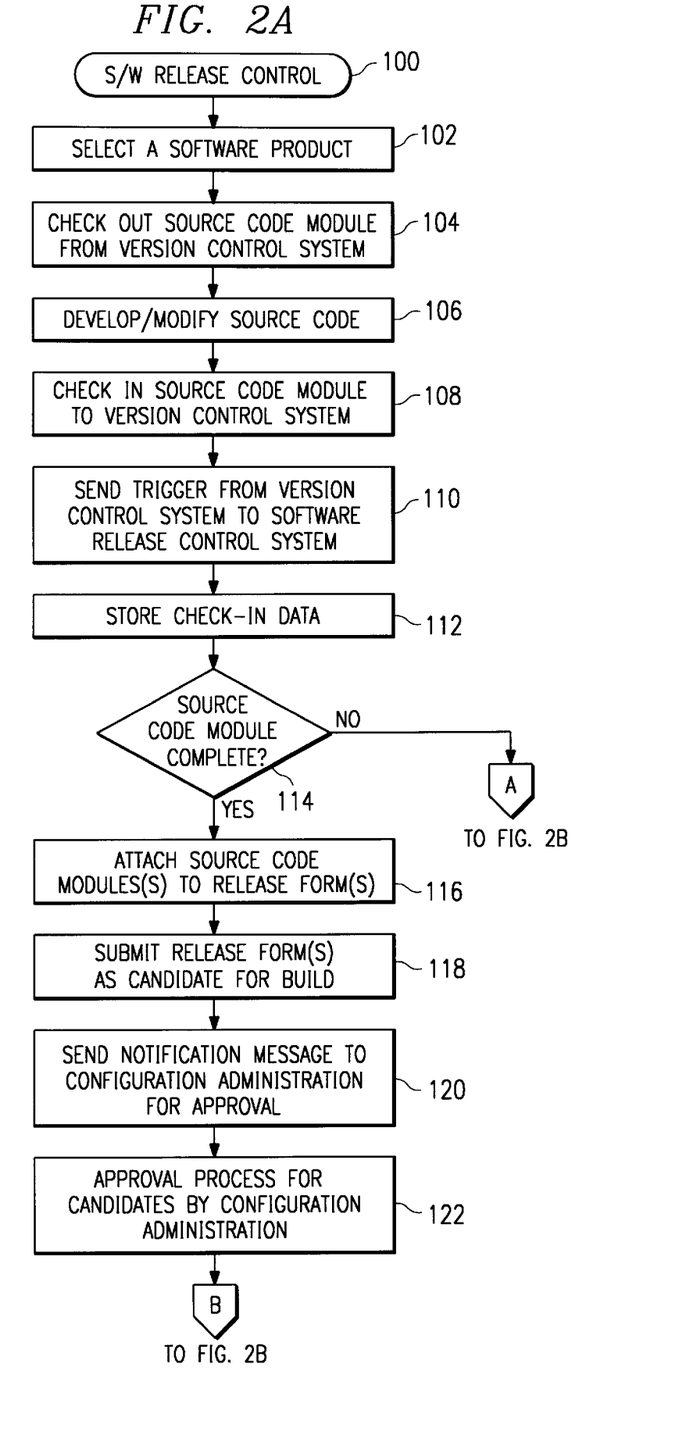
FIGS. 2A and 2B are an exemplary flowchart of a software release control process according to the teachings of the present invention.
Figure 2B:
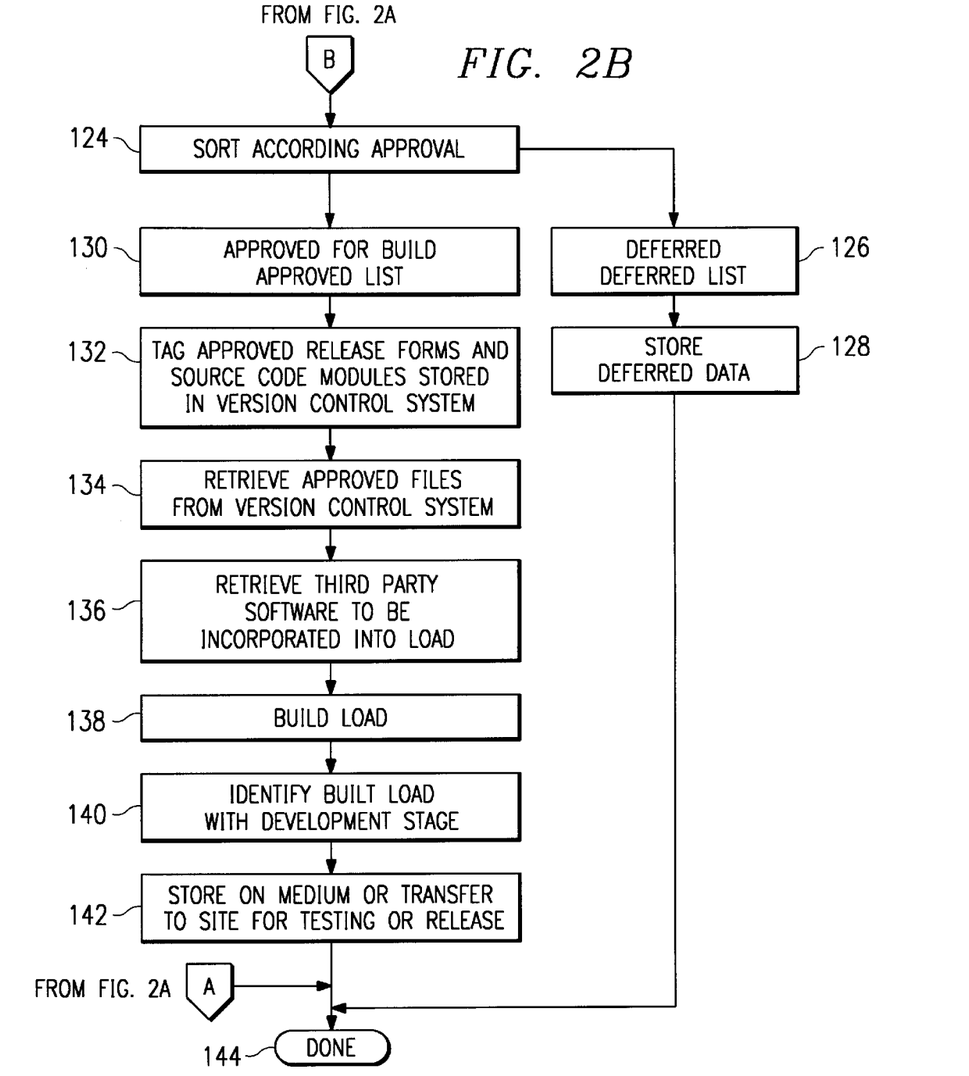

FIGS. 2A and 2B is a flowchart describing the process of software release control 100. References may also be made to various system components shown in FIG. 1 and to the diagram in FIG. 3 providing an illustration of the process.

Figure 3:
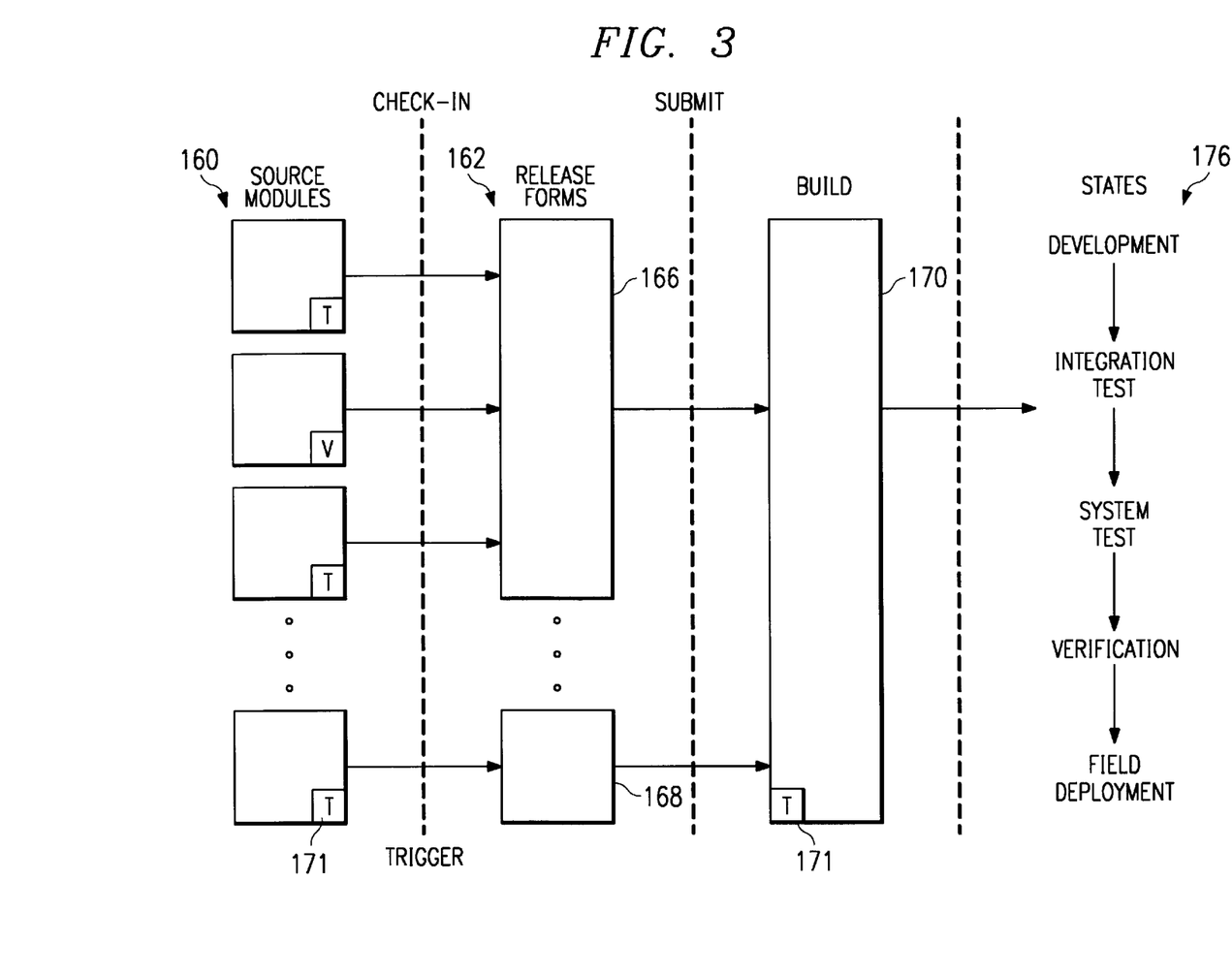
FIG. 3 is a block diagram illustrating the software release control process.

A user, typically a software engineer engaged in the development, modification, or testing of software code, logs into system 10 and selects a software product from a displayed list of existing or developing software products, as shown in block 102. If the source module that the engineer desires to work on is already checked into version control subsystem 12, then it is checked out therefrom, as shown in block 104. The engineer then codes or modifies the source module, as shown in block 106. At the end of the work session, the source module is checked back into version control subsystem 12 in block 108. When a source module is checked into version control subsystem 12, a trigger sends check-in data to software release control system 10, as shown in block 110. This check-in process is shown in FIG. 3, where source modules 160 are checked into version control subsystem 12 and causing triggers to be invoked and received by software release control system 10.

In block 112 of the flowchart, the check-in data are stored by software release control system 10. If the source module is completed, then its associated check-in data may be attached to open release form 166 and 168, as shown in block 116 and illustrated in FIG. 3. A release form is a logical grouping of check-in data associated with source modules checked into version control subsystem 12. A release form is typically associated with a particular problem report number or feature specification documentation number. When a release form is associated with a problem report number, the source modules associated therewith are developed or modified in response to the problem reported. When a release form is associated with a feature specification documentation number, the source modules associated therewith are typically developed for a new release. Once the release forms are complete, they are submitted as candidates for a particular build 170, as shown in block 118 and illustrated in FIG. 3.

Software release control system 10 preferably provides a graphical and menu-driven user interface for prompting for data entry and displaying options. For example, to attach check-in data of source modules to a release form, the user may select from a list of possible functions related to release forms, such as listing of currently open release forms, creating a new release form, attaching check-in data to a release form, submitting a release form, etc. A pointing device such as a mouse may be used to select the desired option from the list. To attach check-in data to release forms, the user may select the appropriate option, which brings up a list of currently open release forms for selection. The selection of a release form then causes a list of unattached check-in data for the software product in question that are associated with the particular user. The user may then select one or more check-in data for attachment to the release form. The user may also be prompted to provide additional data for each check-in data selected, such as the date of any preliminary logical inspection of the source module (such as a Fagan inspection), a problem report number or a feature specification documentation number, etc.

Returning to FIGS. 2A and 2B, in block 120, when release forms are submitted for a build, an electronic notification message may be automatically generated and sent to designated personnel having the responsibility of assigning and approving submitted release form(s) to a particular build, such as a configuration administrator. The configuration administrator may then assign the release form to a build and approve the build, as shown in block 122. The release forms are sorted according to approval—those release forms approved for a build and those release forms not approved for a build, as shown in blocks 124 and 126. The release forms not approved for a build may be deferred for a later build, and the associated data are stored, as shown in block 128. Although not shown explicitly, release forms may also be disapproved or rejected for a number of reasons, which may be unsubmitted or deleted from system 10 after a predetermined time period. In block 130, the approved release forms are then provided in a list, which is used to tag or label all source modules 160 stored in database 18 that are to be included in build 170, as shown in block 132 and FIG. 3. The build label identifies the product, version, and build in which the tagged source modules will be incorporated. System 10 further provides for the permanent identification 171 of versions of source modules 160 with a specific build 170 of a product.

A configuration administrator may initiate a build after all necessary release forms have been submitted, approved, assigned, and tagged. Software release control system 10 first retrieves source modules that bear the appropriate build label from version control subsystem 12, as shown in block 134, and also retrieves any third party software from version control subsystem 12, as shown in block 136. A build script is then invoked and executed to compile and link the source modules, third party software, and any other files necessary for the execution of the resultant software product, as shown in block 138. As shown in FIG. 3, the built load may be in any one of development stages 176: development, integration test, system test, verification, and field deployment, and is so identified in its load number or part number identifier. For example, a load number may indicate, sequentially, the customer identifier, part number, release, point release, maintenance release, feature release, development state V, and version number. Development state V may indicate the verification stage, for example. In block 142, the build may then be downloaded to a portable storage medium for delivery to a customer, electronically transferred to a desired destination for delivery or testing, or downloaded to a test bed for testing purposes. A build report summarizing information related to the build may also be generated.

Figure 4:
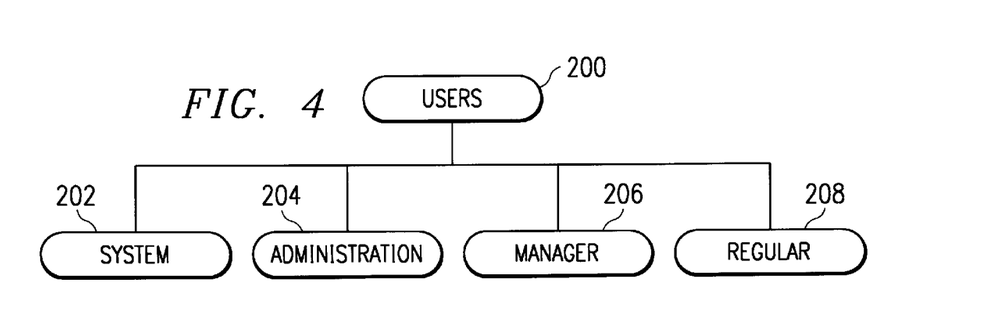
FIG. 4 is a diagram illustrating the users of software release control system.

It may be seen that software release control system 10 preferably provides a number of security levels to users having differing needs and assigned tasks. Referring to FIG. 4, users 200 of system 10 may be assigned roles, such as system 202, administration 204, manager 206, and regular 208. For example, regular users 208 may have access to those functions related to creating release forms, attaching the source modules to release forms, and submitting release forms. Manager users 206 may have the additional ability to assign release forms to builds for those software products for which they have authorization during selected development stages, such as development and integration test. Administration users 204 may additionally have access to build administration functions, such as initiating the tagging source modules with build labels and specifying third party software. System users 202 may have unrestricted access to all resources.

Figure 5:
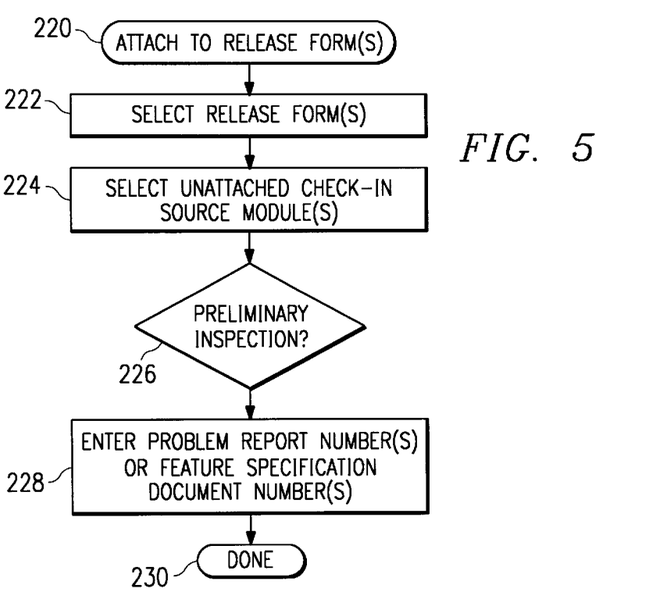
FIG. 5 is an exemplary flowchart of a process to attach source modules to release forms.

FIG. 5 provides additional details on an exemplary process to attach a source module to a release form 220. From a display of a list of open release forms, the user may select one or more release forms, as shown in block 222. A listing of source modules associated with the user and checked into version control subsystem 12 are then displayed for the user's selection, as shown in block 224. For each selected source module, the user is prompted to provide certain predetermined information, such as whether a preliminary inspection, for example Fagan inspection, was performed and date of the inspection, as shown in block 226. The user will also be prompted to enter problem report number(s) or feature specification document number(s) associated with the source module, as shown in block 228. Software release control system 10 then groups the selected source module with the selected release form. The attachment process ends in block 230.

Figure 6:
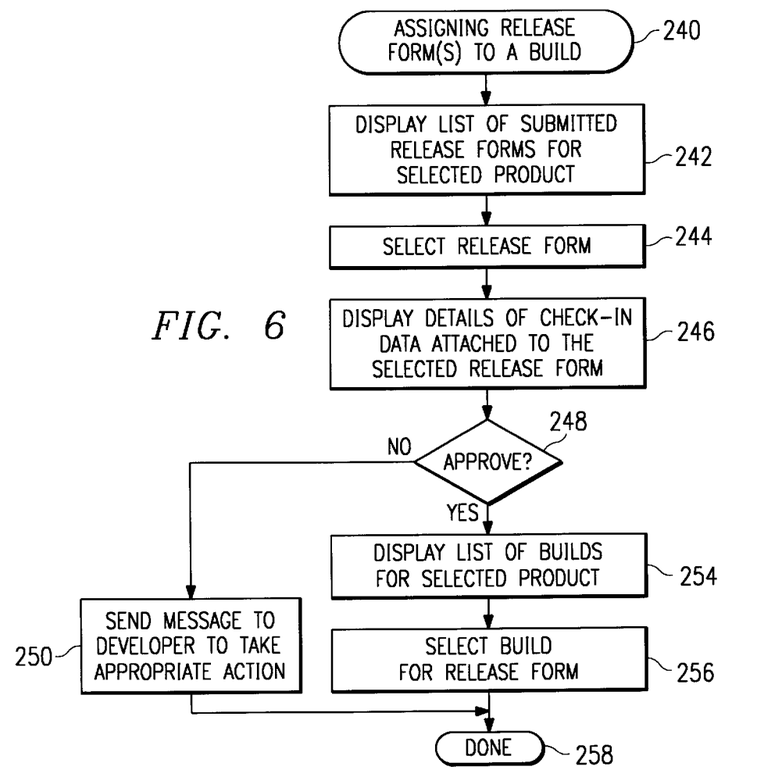
FIG. 6 is an exemplary flowchart of a process to assign release forms to a build.

As described above, after source modules are attached to release forms primarily by the engineers or developers, the release forms are then assigned to a build, primarily by build administrators. Referring to FIG. 6, an exemplary assignment process 240 is shown. A list of release forms submitted for a given product is displayed, as shown in block 242. The user, such as build administrator, selects a release form from the list, as shown in block 244. In block 246, details of check-in data associated with the selected release form are then displayed, so that the user may review the details and indicate his/her approval, as shown in block 248. If the user disapproves of the release form, then an electronic message may be generated and sent to the developer(s) associated with the source modules so that appropriate action may be taken, as shown in block 250. If the release forms are approved, then a list of builds for the selected software product is displayed, as shown in block 254. The user may then select the build that will incorporate the approved release form, as shown in block 256. The process ends in block 258 thereafter.

Figure 7:
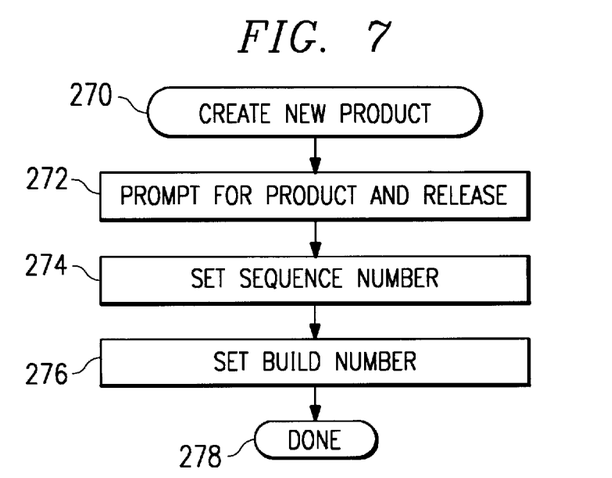
FIG. 7 is an exemplary flowchart of a create new product process.

Referring to FIG. 7, an exemplary process 270 for creating a new software product in software release control system 10 is shown. As described above, it is preferable to limit access to this function to users with system authority. When this option is selected, system 10 prompts for the product identifier and release number, as shown in block 272. A sequence number and a build index number are then set by system 10, as shown in blocks 274 and 276. For example, sequence number may be set to 1 and the build index number may be set to 0. The process ends in block 278. When the user enters product and release number of an existing product, error messages may be displayed.

Figure 8:
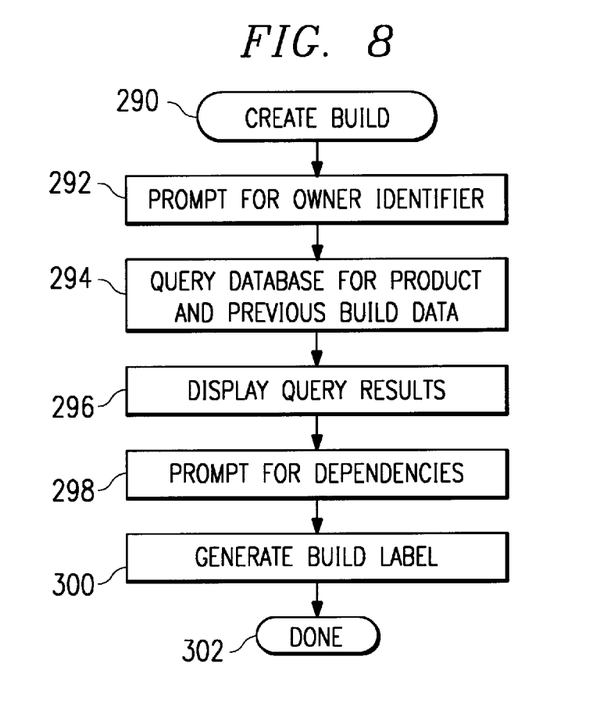
FIG. 8 is an exemplary flowchart of a process to create a build.

FIG. 8 shows an exemplary process for creating a new build 290. When this function is selected by the user, the screen displays a prompt for the user to identify the owner of the build, as shown in block 292. system 10 then queries and obtains from the check-in database information on software products and previous builds known to be related to the owner identifier entered by the user, as shown in block 294. The result is displayed for the user to select the software product and a build, as shown in block 296. Dependencies such as operating system and environment variables which specify certain values to be used in the build are either copied from an existing build and modified or entered by the user for the new build, as shown in block 298. Other information such as specifying third party software may also be entered at this time. A build label for the new build is then generated, based on the information given, as shown in block 300. The create new build process ends in block 302.

Figure 9:
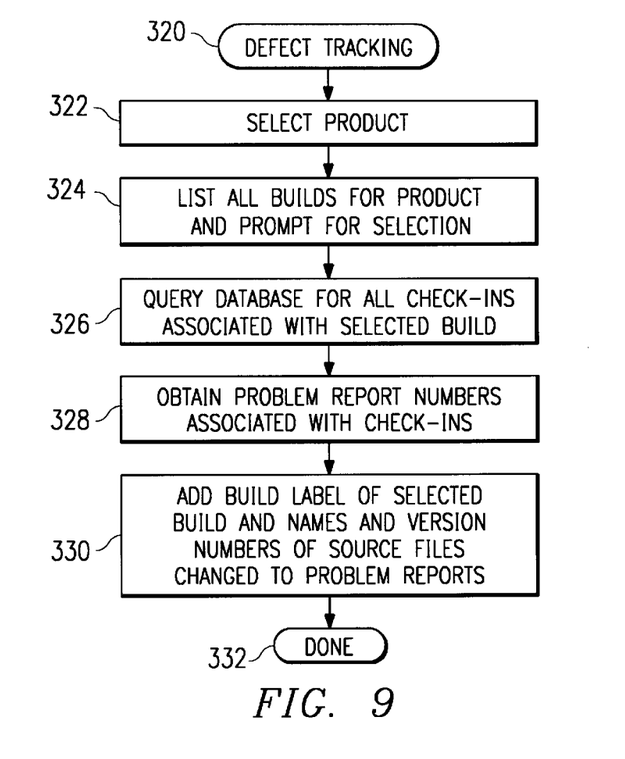
FIG. 9 is an exemplary flowchart of a process for defect tracking.

As described above, software release control system 10 is also capable of tracking defects in previous versions and how these defects are fixed in subsequent versions. An exemplary process 320 performed by defect tracker 32 (FIG. 1) is shown in FIG. 9. References are also made to FIG. 10, which provides a graphical illustration of the process. A product and a build are first specified or selected from lists displayed by system 10, as shown in blocks 322 and 324. With this information, defect tracker 32 obtains a list of all check-in data of all source modules associated with the selected build and product, as shown in block 326. Problem report numbers that are specified in the check-in data are then obtained, as shown in block 328. As identified by the problem report numbers, those problem reports stored in problem reporting tool 24 (FIG. 1) are labeled with the build label of the present build, as shown in block 330.

Figure 10:
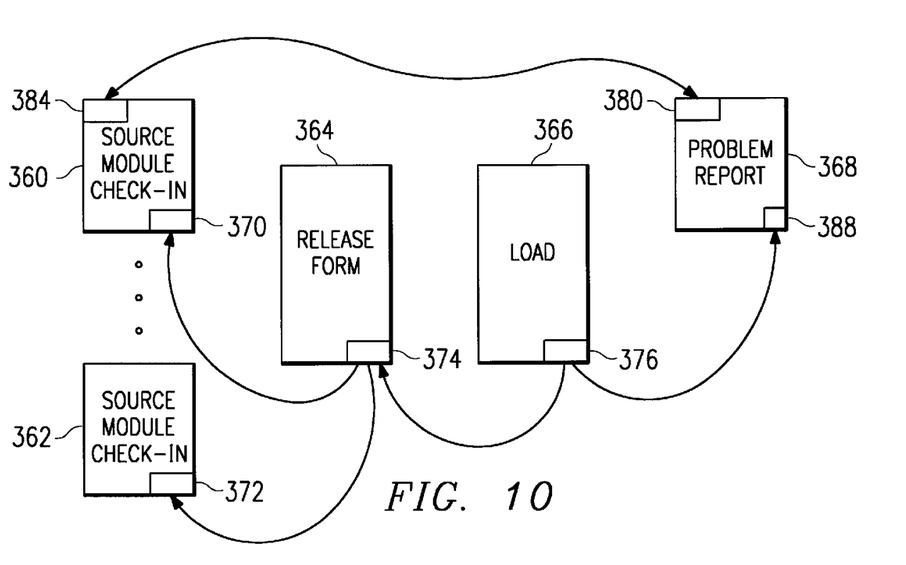
FIG. 10 is a block diagram illustrating defect tracking.

It may be seen in FIG. 10 that source module check-in data 360 and 362, a release form 364 that includes check-in data 360 and 362, and load 366 are all tagged with a build label 370–376. In determining which check-in data and correspondingly, which source module contains the code for fixing a known defect, a problem report number 384 associated with check-in data 360 is used to identify a problem report 368 with the problem report number identifier 380. Problem report 368 is then tagged with a build label 388 that corresponds to load 366. Therefore, the proper association between a load and problem report(s) is made.

Figure 11:
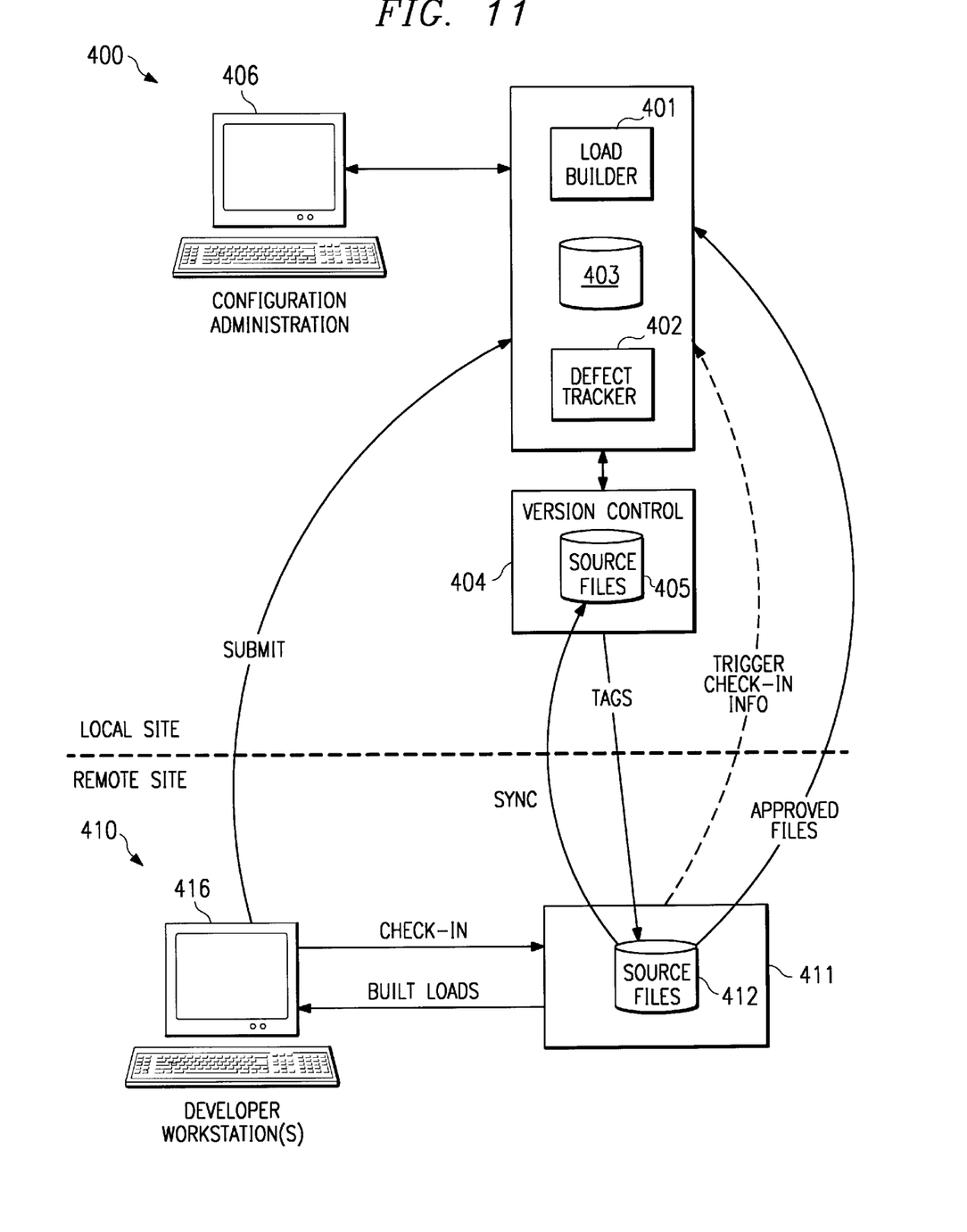
FIG. 11 is a simplified block diagram of a remote access to software release control system.

FIG. 11 shows that a software release control system 400 may also be accessed from a site 410 located remotely from system 400. Software release control system 400 includes a load builder 401, a defect tracker 402, and a database 403, which stores a number of files as described above in conjunction with FIG. 1. A version control subsystem 404 having a database storing source files 405 is coupled to system 400. A workstation 406 may also be coupled to system 400 to provide administrator access thereto. At remote site 410, a second version control subsystem 411 storing source files 412 generated and/or maintained by software engineers at remote site 410 is provided. Version control subsystem 411 is coupled to developer workstations, personal computers, and other suitable tools 416 which facilitate code development.

At the end of a work session, a software engineer checks in source modules to remote version control subsystem 411, which are then stored in source files database 412. As the source modules are checked in, a trigger is invoked and sent to software release control system 400. Similar to the local site application as shown in FIG. 1, the trigger includes check-in data. The trigger may be transmitted over telecommunications networks, computer networks, or a dedicated line, as deemed suitable. In a periodic manner, packets containing the contents of source files database 412 are electronically copied to source files database 405 of local version control subsystem 404 to synchronize the databases, so that the contents thereof are essentially identical over time.

When a user has completed the source modules, he/she may attach them to one or more release forms and then submit the release forms for a build, in the same manner as described above. When release forms are approved for a build, the corresponding source modules stored in remote source files database 412 that make up the release form are tagged with the appropriate build label. The load building process obtains approved files or source modules from remote version control subsystem 411 to build the load. Defect tracking for the remote site is performed in a similar manner as described above, where a build label becomes associated with problem reports. Constructed in this manner, developers may be submit source files from one or more remote sites to one local software release control system for load building and defect tracking.

Figure 12:
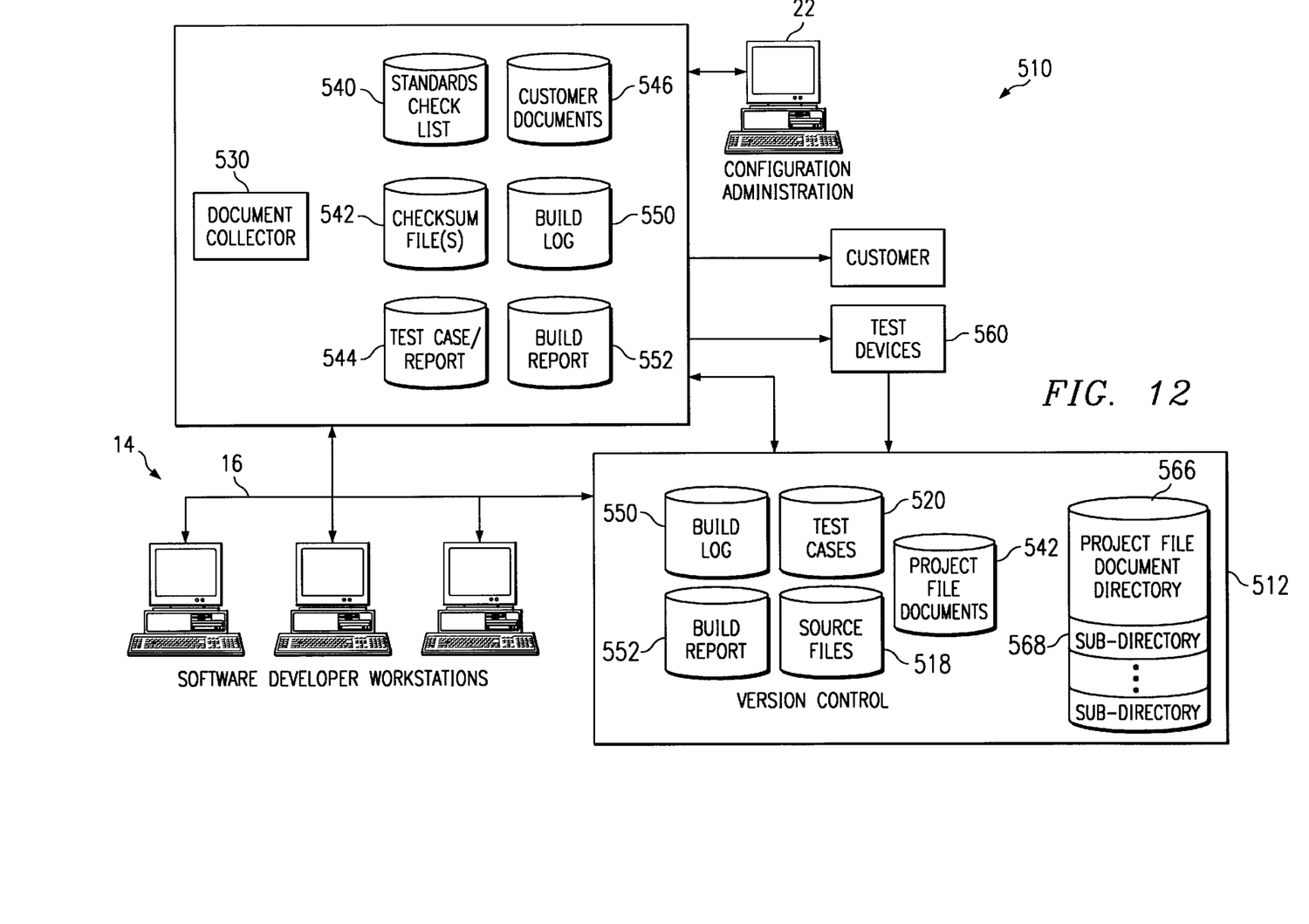
FIG. 12 is a simplified block diagram of a document process control subsystem and method according to the teachings of the present invention.

Referring to FIG. 12, a document process control subsystem 510 of the file release control system is shown. System 510 includes a document collector 530 for the task of collecting, properly labeling, and storing the documentation. System 510 may collect documentation related to a project, including a standards checklist 540, engineering specification documents 542, test cases and reports 544, customer documents 546, project memoranda 550, and build documents 552. Standards checklist 540 refers to the list of criteria by which the software product is judged in each stage of development in order to advance to the next. As the project progresses, the standards that are met are "checked off" the list. Engineering specification documents 542 refer to requirement specifications, design specifications, and other engineering documentation used to the architecture, process flow, and other engineering descriptions of the product. Test cases and reports 544 refer to the collection of documentation related to the testing of the software product on test devices 560, which may include test cases and test results/reports.

Customer documents 546 are documentation that will be delivered to the customer, typically with the delivery of the software product. These may include user's manuals and other documents designed to inform and educate the customer about the specific version and release of the software product and may be in hard or soft copy. Project memoranda 550 may collectively include a range of documentation related to the software product, such as meeting minutes, engineering memoranda, and other items generated during the project. Build documents 552 are related to the load building process, which may include build scripts, build logs, and build reports. Build reports and build logs were generated during the load building process, where the build log records events, messages, actions, and results during the build process, and the build report is a summary of selected information from the build log. Both are also stored in version control subsystem 12. It may be seen that the above-described documentation is generated during several phases of the project: software design and development phase, load building phase, and testing phase. It may also be noted that the documentation may originate from a variety of sources and personnel.

In operation, when work on a new project begins, a project file document directory or database 566 is initialized. Project file document directory 566 may include a number of subdirectories 568 into which specific types or classes of documentation may be stored. For example, project file document directory 566 may include a standards checklist, an engineering specification subdirectory, a test case subdirectory, a test report subdirectory, a customer document subdirectory, a project memorandum subdirectory, and a build document subdirectory. Further subdirectories may also be defined for more specific classes of documents, such as providing a requirement specification subdirectory and a design specification subdirectory under the engineering specification subdirectory.

As documents are drafted, modified, and generated, they are checked into and stored in the proper subdirectories of project file documents 566 in version control subsystem 12. When a document is checked into version control subsystem 12, a trigger sends check-in data to document collector 530. This is similar to the source code module check-in process described above in conjunction with FIG. 2A. At check-in, document collector 530 prompts for a feature specification documentation number or part number that is to be associated with the document. The document is then labeled with this number. Further, the classification of documentation, e.g. engineering specification, test cases, project memoranda, is explicitly specified by the user so as to determine into which project file subdirectory the document is to be stored.

Constructed and automated in this manner, document process control is a process integrated with file release control which uses unique labels to associated all files related to the same version and release of the software product.

Although the present invention and its advantages have been described in detail, it should be understood that various changes, substitutions and alterations can be made therein without departing from the spirit and scope of the invention as defined by the appended claims.

What is claimed is:

1. A software documentation process control system, comprising:
   a version control system operable to process at least one document and associated source module related to a predetermined version and release of a software product; and
   a document collector coupled to the version control system and adapted for associating the at least one document and associated source module with the predetermined version and release of the software product;
   a load builder operable to generate the predetermined version and release of the software product from selected documents and associated source modules identified with the predetermined version and release of the software product.

2. The system, as set forth in claim 1, wherein the at least one document comprises engineering specification documentation.

3. The system, as set forth in claim 1, wherein the at least one document comprises test cases and reports.

4. The system, as set forth in claim 1, wherein the at least one document comprises a standards checklist.

5. The system, as set forth in claim 1, wherein the at least one document comprises customer documentation.

6. The system, as set forth in claim 1, wherein the at least one document comprises project memoranda.

7. The system, as set forth in claim 1, wherein the at least one document comprises documents associated with load building.

8. The system, as set forth in claim 1, further comprising a project file document directory for storing the at least one document according to document classification.

9. The system, as set forth in claim 1, further comprising a project file document directory having a plurality of subdirectories for storing the at least one document according to document classification.

10. An automated method for document process control, comprising the steps of:
    receiving at least one document and associated source module;
    assigning a unique label indicative of a part number of a software product to the at least one document and the associated source module; and
    storing the at least one document in a predetermined project file document directory;
    building the software product from selected documents and associated source modules having the unique label.

11. The automated method, as set forth in claim 10, further comprising the steps of:
    determining the type of the at least one document; and
    storing the at least one document into a subdirectory of the project file document directory in response to the determined document type.

12. The automated method, as set forth in claim 10, further comprising the step of:
    checking in the at least one document into a version control system; and
    generating check-in data associated with the document.

13. The automated method, as set forth in claim 10, further comprising the step of providing an interactive user interface for displaying information, prompting data entry by users, and receiving information associated with each of the steps.

14. The automated method, as set forth in claim 10, wherein the assigning step comprises the step of assigning a feature specification documentation number to the at least one document.

15. An automated method for software file release with documentation process control, comprising the steps of:
    receiving and storing check-in data related to source modules checked into a version control system;
    receiving and storing check-in data related to documentation checked into the version control system;
    associating the documentation with the source modules and a specific version and release of a software product;
    storing the documentation in a project file document directory associated with the specific version and release of the software product; and
    tagging the documentation with a unique label indicative of the specific version and release of the software product;
    building the specific version and release of the software product from documentation and associated source modules identified with the specific version and release of the software product.

16. The automated method, as set forth in claim 15, further comprising the steps of:
    determining the type of the documentation; and
    storing the documentation into a subdirectory of a project file document directory in response to the determined document type.

17. The automated method, as set forth in claim 15, further comprising the step of providing an interactive user interface for displaying information, prompting data entry by users, and receiving information associated with each of the steps.

18. The automated method, as set forth in claim 15, wherein the tagging step comprises the step of assigning a feature specification documentation number to the at least one document.

* * * * *